(12) United States Patent
Paul et al.

(10) Patent No.: US 12,093,587 B1
(45) Date of Patent: Sep. 17, 2024

(54) SYSTEM, METHOD, AND COMPUTER PROGRAM FOR UNIFIED MANAGEMENT OF MULTIPLE MASTER-AGENT JOB EXECUTION ENVIRONMENTS

(71) Applicant: Amdocs Development Limited, Limassol (CY)

(72) Inventors: Debmalya Paul, Pune (IN); Yogesh Guhagarkar, Pune (IN); Pranay Pawar, Pune (IN); Dinesh Bansal, Pune (IN); Jatin Lala, Ajmer (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 18/236,877

(22) Filed: Aug. 22, 2023

(51) Int. Cl.
*G06F 3/12* (2006.01)

(52) U.S. Cl.
CPC ............ *G06F 3/126* (2013.01); *G06F 3/1207* (2013.01); *G06F 3/121* (2013.01); *G06F 3/1234* (2013.01); *G06F 3/1259* (2013.01); *G06F 3/1291* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 9,552,183 B2* | 1/2017 | Plumettaz | ............ | G06F 3/1211 |
| 2013/0132967 A1* | 5/2013 | Soundararajan | ...... | G06F 16/172 |
| | | | | 709/201 |
| 2014/0215481 A1* | 7/2014 | Piet | ........................ | G06F 9/5061 |
| | | | | 718/104 |

* cited by examiner

*Primary Examiner* — Jacky X Zheng
(74) *Attorney, Agent, or Firm* — Zilka-Kotab, P.C.

(57) ABSTRACT

As described herein, a system, method, and computer program are provided for unified management of multiple master-agent job execution environments. Job scheduling information is accessed for a plurality of different environments each having a corresponding master that schedules job executions across a plurality of respective agents. Unified job scheduling management across the plurality of different environments is provided, using the job scheduling information.

18 Claims, 6 Drawing Sheets

```
                      (Est)    (Est)
CPU   Schedule SchedTime Job            State Pr Start  Elapse RetCode Deps <Server-Name>#SYI2279+ 1800 06/14 ******** HOLD   41(06/14)(00:02)      {06/14/22}; <Server-Name>#SYICSBCAMRPMAIL(1800 06/14/22).0
       (<Server-Name>#)NODE054            HOLD    41(06/14)(00:02)

<Server-Name>#SYICSEC+ 1800 06/14 ******** STUCK 41           (00:05)    {06/14/22}
             SCSBCAM+ HOLD   0(06/14)(00:05)

<Server-Name>#SYL3142+ 1800 06/15 ******** HOLD   41(06/15)(00:01)      {06/15/22}; <Server-Name>#SYLCSRSPATTDX(1800 06/15/22).0
       (<Server-Name>#)NODE984            HOLD    41(06/15)(00:01)

<Server-Name>#SYLCSRS+ 1800 06/15 ******** ABEND 41 06/16  00:01         {06/15/22}
             SCSRSPA+ ABEND 41 06/16 00:01                        1 438459

<Server-Name>#SAJ1975+ 1800 03/30 ******** HOLD   41(03/30)(00:01)      {03/30/23}; <Server-Name>#SAJGNDBABACKUP(1800 03/30/23).0
       (<Server-Name>#)NODE034            HOLD    41(03/30)(00:01)

<Server-Name>#SAJGNDB+ 1800 03/30 ******** ABEND 41 03/31  00:02         {03/30/23}
             SGNDBAB+ SUCC    41 03/31  00:02                     0 4076460
       (<Server-Name>#)SGNDBAB+ SUCC    41 03/31  00:01                   0 4065752
Continue (enter "y" for yes, "q" for no)?
```

SYSTEM, METHOD, AND COMPUTER PROGRAM FOR UNIFIED MANAGEMENT OF MULTIPLE MASTER-AGENT JOB EXECUTION ENVIRONMENTS

FIELD OF THE INVENTION

The present invention relates to master-agent batch job scheduling tools.

BACKGROUND

Batch scheduling tools available in the market work on the principle of one master and multiple agents to schedule and execute the job (e.g. task) on remote machines. In actual complex/large environments of major organizations, there are multiple similar setups of different master-agents' pairs (e.g. master1-agents, master2-agents, masterN-agents).

Currently available batch scheduling tools do not have any capability to communicate between multiple environments, and therefore cannot show a consolidated view of all the agents across different masters to monitor or take any action. As such, existing scheduling tools cannot show a consolidated status of all jobs in a single page from multiple masters in a single place nor do they have a single page to take actions, see proactive alerting, or take advantage of advance features such as integration with self-healing, smart rule-based engine to take decisions, dashboards, summary views to display overall status, etc. This makes it quite difficult and expensive to manage multiple environments in an organization.

There is thus a need for addressing these and/or other issues associated with the prior art. For example, there is a need to provide unified management of multiple master-agent job execution environments.

SUMMARY

As described herein, a system, method, and computer program are provided for unified management of multiple master-agent job execution environments. Job scheduling information is accessed for a plurality of different environments each having a corresponding master that schedules job executions across a plurality of respective agents. Unified job scheduling management across the plurality of different environments is provided, using the job scheduling information.

DETAILED DESCRIPTION

Figure 1:
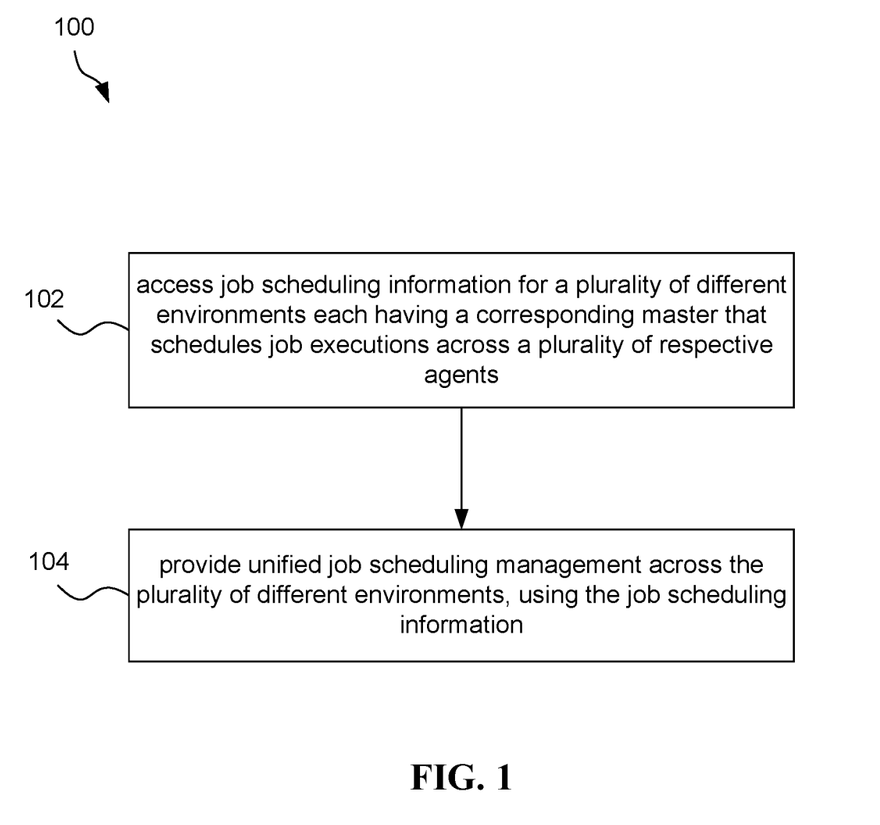
FIG. 1 illustrates a method for unified management of multiple master-agent job execution environments, in accordance with one embodiment.

FIG. 1 illustrates a method 100 for unified management of multiple master-agent job execution environments, in accordance with one embodiment. The method 100 may be carried out by a computer system, such as that described below with respect to FIGS. 4 and/or 5. In an embodiment, the computer system may interface other computer systems each implementing a respective one of the master-agent job execution environments.

With respect to the present description, a master-agent job execution environment refers to a computing environment in which a master process schedules jobs for execution by a plurality of respective agent processes. The jobs, which may be any processing task, may be scheduled in sequence, in parallel, or in any combination thereof. According, a "master" refers to a process that performs the job scheduling, whereas an "agent" refers to a process that executes jobs as scheduled. In an embodiment, the master may be located on a server whereas the agents may be located on remote, or virtual, machines.

In operation 102, job scheduling information is accessed for a plurality of different environments each having a corresponding master that schedules job executions across a plurality of respective agents. The plurality of different environments refer to different master-agent job execution environments, as defined above. In an embodiment, the job scheduling information may be accessed from each master of each environment of the plurality of different environments. In an embodiment, the job scheduling information may be accessed from a scheduling tool instance associated with each environment of the plurality of different environments. In various embodiments, the job scheduling information may be pulled from each environment or pushed by each environment, for example according to a periodic schedule.

The job scheduling information refers to any information associated with job scheduling on the environments. In an embodiment, the job scheduling information may include an indication of jobs scheduled per master-agent job execution environment. For example, the job scheduling information may include, for each environment of the plurality of different environments, a map of jobs scheduled by the corresponding master for execution by the plurality of respective agents. The map, e.g., End of Day (EOD) or End of Month (EOM), may indicate each scheduled job (e.g. including scheduled start time), and dependencies between scheduled jobs.

In another embodiment, the job scheduling information may include, for each environment of the plurality of different environments, an execution status of jobs scheduled by the corresponding master for execution by the plurality of respective agents. The execution status may indicate that a job execution has started, is in progress, has successfully completed, or has failed.

In operation 104, unified job scheduling management across the plurality of different environments is provided, using the job scheduling information. The unified job scheduling management refers to one or more management functions that is performed using the job scheduling information. The unified job scheduling management may be provided by an orchestration platform, for example which includes an interface for defining rules (e.g. for all jobs or per job) for the unified job scheduling management.

In an embodiment, the unified job scheduling management may include displaying the job scheduling information for the plurality of different environments in a consolidated view (e.g. in a single browser). In an embodiment, the unified job scheduling management may include performing an action triggered by a business rule defined for the job scheduling information. The business rule may be defined for all scheduled jobs or on a per job basis.

In an embodiment, the unified job scheduling management may include issuing an alert based on the job scheduling information. The alert may be proactively issued for a scheduled job that has not started and/or completed during a scheduled time period. As another example, the alert may be reactively issued when execution of a scheduled job fails.

In an embodiment, the unified job scheduling management may include automatic reprocessing of failed jobs. In an embodiment, the unified job scheduling management may include automatic healing with predefined fixes in case of job execution failure.

In an embodiment, the orchestration platform mentioned above may include an exposed application programming interface (API) for integration with additional job execution monitoring tools. In an embodiment, the orchestration platform may be integrated with a ticketing system for creating tickets for failed job executions.

To this end, the method 100 may be performed for providing unified management of multiple master-agent job execution environments, including communicating with multiple masters using Secure Shell or similar to provide one consolidated view from all masters and agents. This method 100 may in turn allow centralized checking of status and taking of actions across the maps for all master-agent job execution environments. In addition, this method 100 may allow for the defining of automatic actions triggered by actions from agents across different masters, where the automatic actions may be automatic phone calling, automatic healing solutions, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
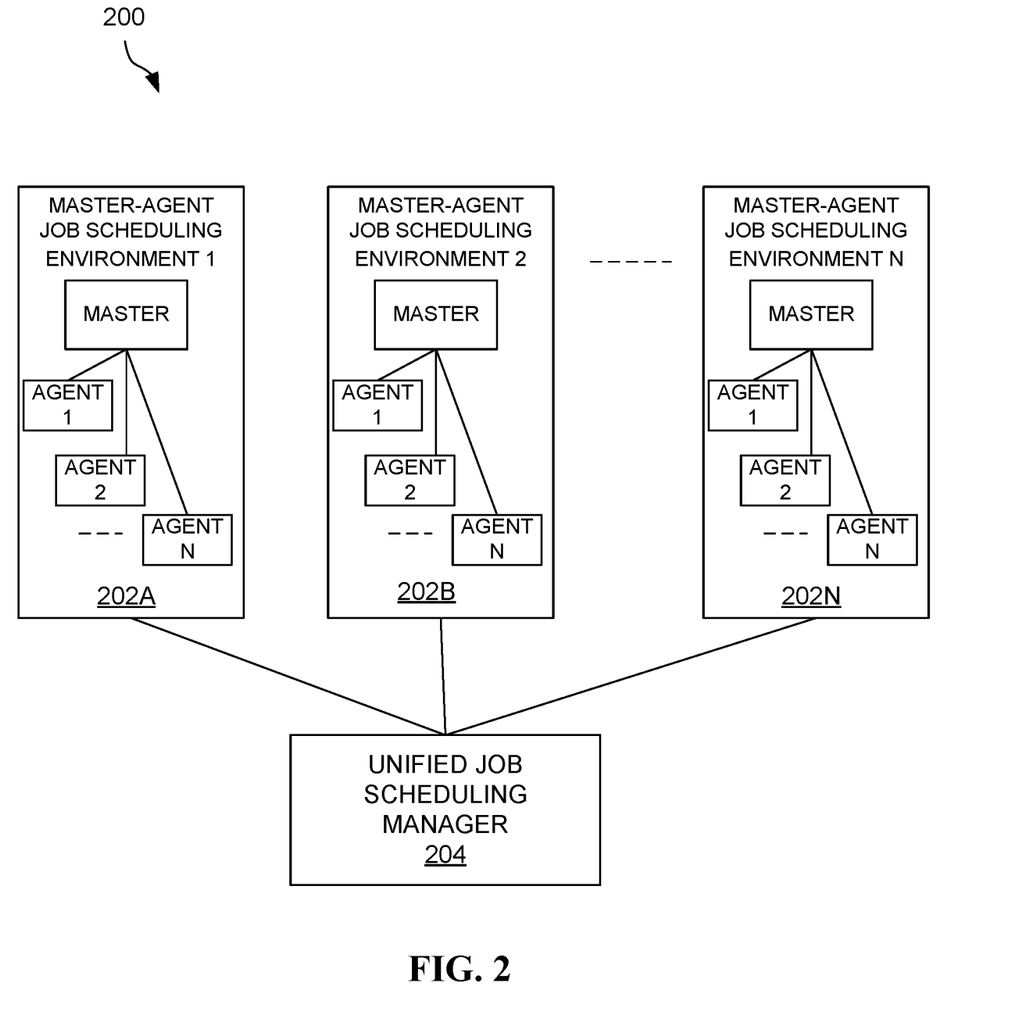
FIG. 2 illustrates a system for unified management of multiple master-agent job execution environments, in accordance with one embodiment.

FIG. 2 illustrates a system 200 for unified management of multiple master-agent job execution environments, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a plurality of master-agent job execution environments 202A-N. Each master-agent job execution environment 202A-N includes a master and its associated agents. The master schedules jobs for execution by the agents. In an embodiment, the master and agents may be located on a same physical computing system. In another embodiment, the master and agents may be located on different physical computing systems. In an embodiment, the master may be located on a server whereas the agents may be located on remote, or virtual, machines.

The system also includes a unified job scheduling manager 204 which interfaces the plurality of master-agent job execution environments 202A-N. In an embodiment, the unified job scheduling manager 204 may interface each master of the plurality of master-agent job execution environments 202A-N (e.g. via an application programming interface (API)).

The unified job scheduling manager 204 is a platform, computer system, or software application that accesses job scheduling information from the master-agent job execution environments 202A-N and that provides unified job scheduling management across the plurality of different environments, using the job scheduling information. In an embodiment, the unified job scheduling manager 204 is configured to pull the job scheduling information from the master-agent job execution environments 202A-N, for example on a periodic basis or upon some defined trigger. In another embodiment, the masters of the master-agent job execution environments 202A-N may be configured to push the job scheduling information to the unified job scheduling manager 204, for example on a periodic basis or upon some defined trigger.

The unified job scheduling manager 204 uses the job scheduling information to provides unified job scheduling management across the plurality of different environments. In various embodiments, this job scheduling management may include displaying the job scheduling information for the plurality of different environments in a consolidated view (e.g. in a single browser), performing actions triggered by business rules defined for the job scheduling information, issuing alerts based on the job scheduling information, performing automatic reprocessing of failed jobs, and/or performing automatic healing with predefined fixes in case of job execution failure.

To this end, the unified job scheduling manager 204 may provide centralized monitoring and management of independently running master-agent job execution environments 202A-N, which would otherwise need to each be independently monitored and managed (e.g. by a person, using an independent set of rules, via independent interfaces, etc.). Furthermore, the unified job scheduling manager 204 may allow management to be provided in the context of the master-agent job execution environments 202A-N as a whole, for example including making decision on the job scheduling information across multiple of the master-agent job execution environments 202A-N.

Figure 3:
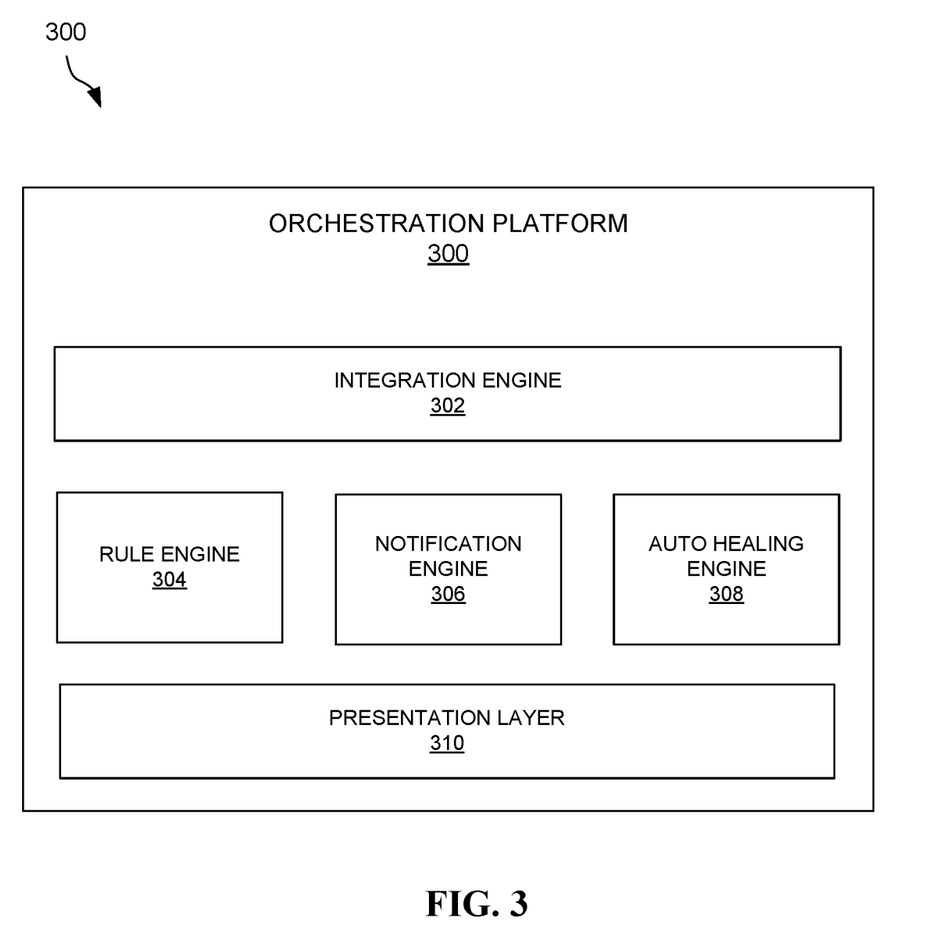
FIG. 3 illustrates an orchestration platform for unified management of multiple master-agent job execution environments, in accordance with one embodiment.

FIG. 3 illustrates an orchestration platform 300 for unified management of multiple master-agent job execution environments, in accordance with one embodiment. As an option, the orchestration platform 300 may be implemented in the context of the details of the previous figure and/or any subsequent figure(s). For example, the orchestration platform 300 may be an implementation of the unified job scheduling manager 204 of FIG. 2. Of course, however, the orchestration platform 300 may be implemented in the context of any desired environment. Further, the aforementioned definitions may equally apply to the description below.

The following definitions apply to the embodiments of the orchestration platform 300:

Job: A job is an executable file, program, task, or command that is scheduled and launched by the master on the agent.

Dependency: A dependency is a prerequisite that must be satisfied before processing/executing a job by master. Dependencies can be defined for jobs and job streams to ensure the correct order of processing.

Map: A Map is a collection of jobs and dependencies that are executed in a batch scheduler sequentially or parallelly or in defined a manner to achieve the completion of a task. This view shows the jobs it contains and their associated dependencies.

Job Action: In a map, various actions need to be taken on jobs, so that the map can be executed, and the final output can be achieved. Various actions like manual execute, manual kill, confirm success, hold, release, release schedule, cancel are some of the examples of job actions which are manually handled by end user as per requirement.

Environment: One large and complex organization may have one or many environments with each environment having their respective one master with multiple agents' setup.

As shown, the orchestration platform 300 includes an Integration Engine 302 which acts as an automated orchestrator to interact with different instances of scheduling tools to fetch job scheduling information and take actions based on business defined rules. The orchestration platform can also be triggered by an operator which takes care of all the flows and thereby making it a one click solution, also known as OCEOD (One Click EOD). The Integration Engine 302 integrates data from all the master-agent job execution environments and displays the data for all jobs/maps on a single screen in a consolidated view. This master dashboard shows data for all environments and an operator can take one click actions through it. This makes the job of an operator extremely easy when handling and monitoring multiple maps across multiple environments, thereby eliminating human intervention and monitoring misses.

A Rule Engine 304 decides what action needs to be taken based upon the business defined rules. This solves the critical time taking dependency between maps. This engine 304 also provides mistake proofing logic to the end user when dealing with critical jobs being rerun when failed or confirming success a failed job. This feature helps in minimizing issues which can cause a major outage in the system due to human errors. The user can specify the approval mechanism as well for specific critical jobs to avoid before taking any action.

A Notification Engine 306 sends proactive and reactive alerts in case of delays or issues in a map, which can be configured by end users. It is of immense help when dealing with critical time-based flows. The Notification Engine 306 enables the Integration Engine 302 to directly contact the concerned person in case of critical issues such as a critical job failure. This is possible by integrating it short messaging service (SMS) or phone calling API. Also, multiple email alerts can be configured to the teams of users if needed. The Notification Engine 306 can be integrated with a ticketing system to automatically create a ticket for a job failure or long running job.

An Auto-Healing Engine 308 can take care of automatic reprocessing of failed jobs based on the user pre-defined actions. This is achieved by integrating the Integration Engine 302 to an external automatic healing module, in an embodiment. By integration of this module, automatic handling of job failures for known (e.g. pre-defined) scenarios is achieved which makes the process automated and efficient.

A Presentation Layer 310 provides a graphical user interface (GUI) to display the consolidated job scheduling information, for defining rules, for configuration, for mistake proofing, for user access management, etc.

Thus, the orchestration platform 300 is an all-inclusive single shop solution for effective monitoring of multiple master-agent job execution environments, providing a consolidated view, proactive alerting, rule-based actions, end to end automation of the processes, and an added advantage of a self-healing solution. This solution also eliminates frequent manual mistakes due to a combination of the Rule Engine 304, the Notification Engine 306, and the Auto-Healing Engine 308.

In summary, the orchestration platform 300 may provide:
Pre and Post Map checks.
Unified view for monitoring (for multiple environments) as one consolidated view in one browser instead of multiple browsers.
Critical job mistake proofing with user confirmation for error free operations.
Business specific view for critical business checks.
Business critical jobs are marked separately versus normal jobs for better monitoring and reduced customer impacts.
Proactive alerting for jobs not started and completed on scheduled time.
Defining rules for jobs based on business requirements.
Rule engine-based alerting in case of failures, such as automatic calling to a team on their mobile and escalation to manager.
Automatic healing with predefined fixes in case of job failure.
Management summary view for quicker understanding of complete progress of the process.
Exposure of API for integration with other monitoring tools.
Integration with a ticketing system in case ticket needs to be created for a failure reporting.

Figure 4:
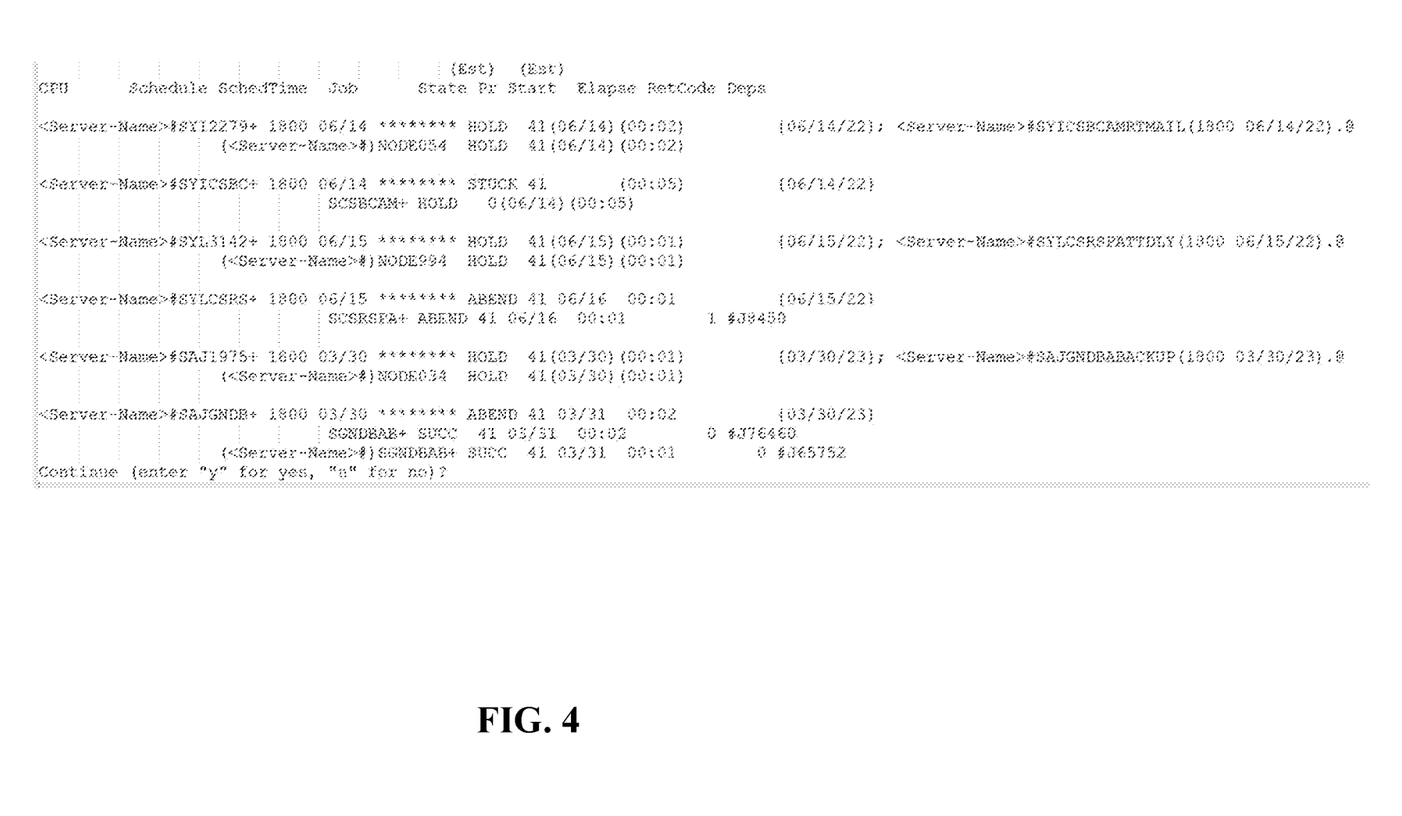
FIG. 4 illustrates exemplary output of the presentation layer of the orchestration platform of FIG. 3, in accordance with one embodiment.

FIG. 4 illustrates exemplary output of the presentation layer 310 of the orchestration platform 300 of FIG. 3, in accordance with one embodiment.

Figure 5:
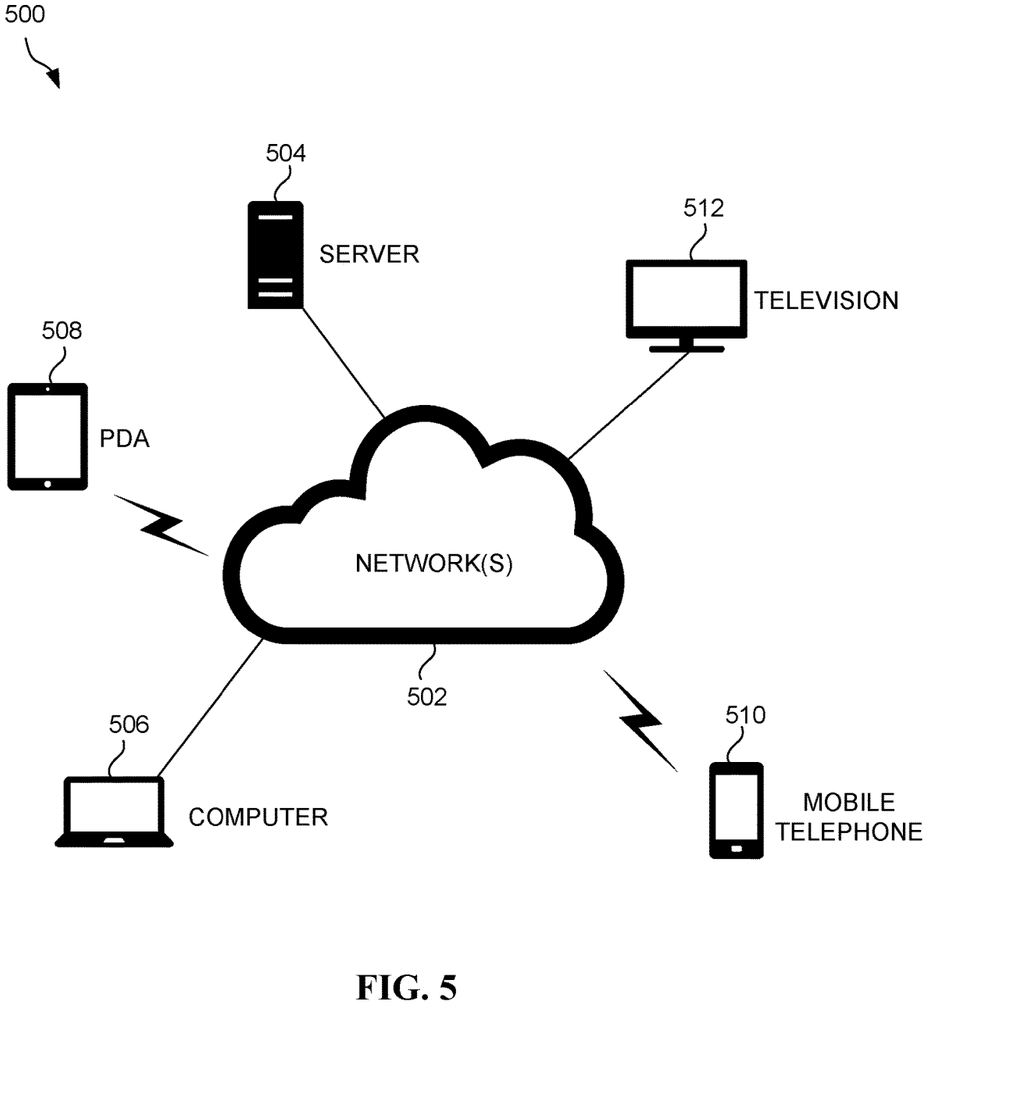
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
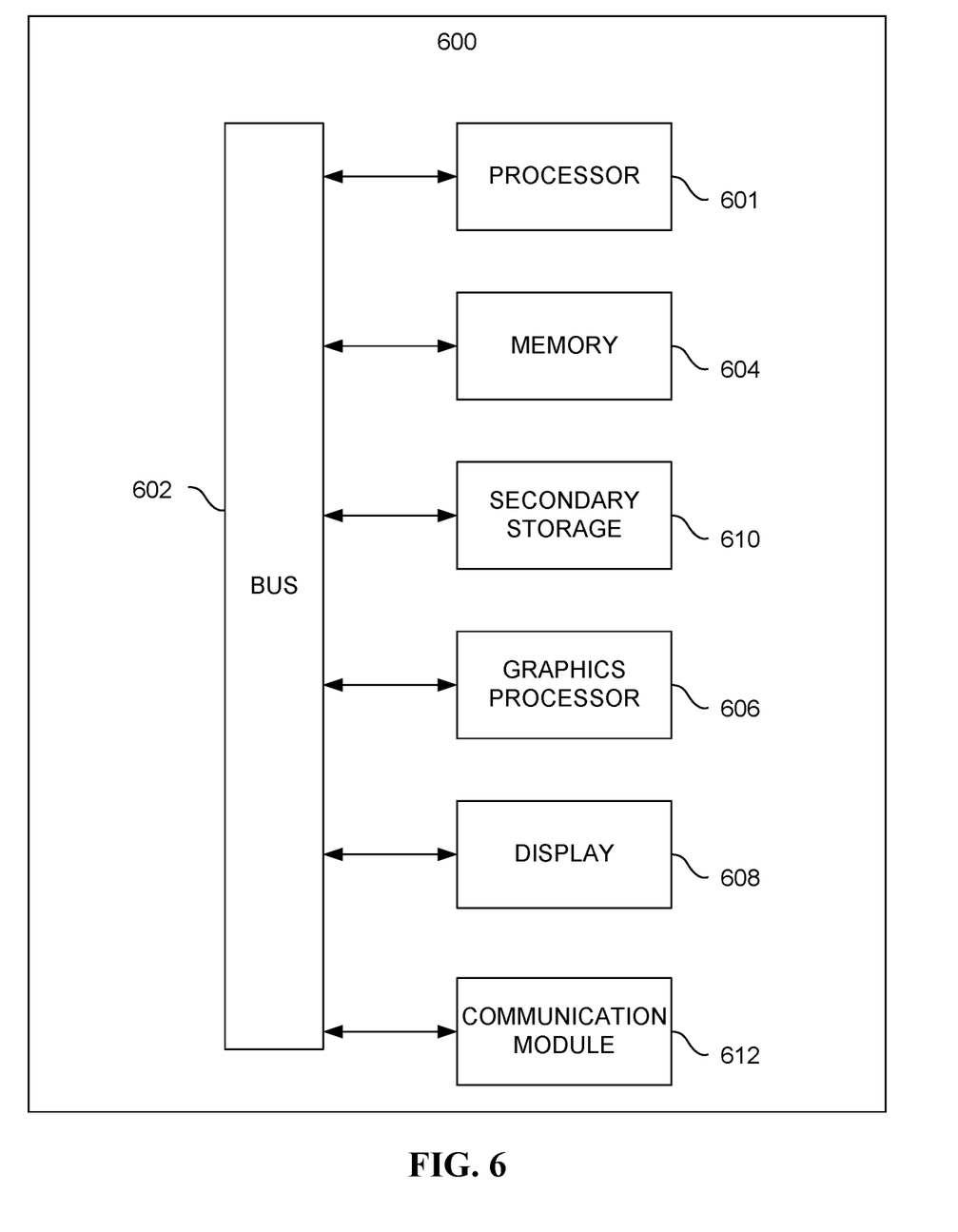
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
   access job scheduling information for a plurality of different environments each having a corresponding master that schedules job executions across a plurality of respective agents, wherein the job scheduling information is accessed from a scheduling tool instance of each master of each environment of the plurality of different environments; and
   provide unified job scheduling management across the plurality of different environments, using the job scheduling information.

2. The non-transitory computer-readable media of claim 1, wherein the job scheduling information includes, for each environment of the plurality of different environments, a map of jobs scheduled by the corresponding master for execution by the plurality of respective agents.

3. The non-transitory computer-readable media of claim 1, wherein the unified job scheduling management includes displaying the job scheduling information for the plurality of different environments in a consolidated view.

4. The non-transitory computer-readable media of claim 1, wherein the unified job scheduling management includes performing an action triggered by a business rule defined for the job scheduling information.

5. The non-transitory computer-readable media of claim 1, wherein the unified job scheduling management includes issuing an alert based on the job scheduling information.

6. The non-transitory computer-readable media of claim 5, wherein the alert is proactively issued for a scheduled job that has not started and completed during a scheduled time period.

7. The non-transitory computer-readable media of claim 5, wherein the alert is reactively issued when execution of a scheduled job fails.

8. The non-transitory computer-readable media of claim 1, wherein the unified job scheduling management includes automatic reprocessing of failed jobs.

9. The non-transitory computer-readable media of claim 1, wherein the unified job scheduling management includes automatic healing with predefined fixes in case of job execution failure.

10. The non-transitory computer-readable media of claim 1, wherein the unified job scheduling management is provided by an orchestration platform.

11. The non-transitory computer-readable media of claim 10, wherein the orchestration platform includes an interface for defining rules for the unified job scheduling management.

12. The non-transitory computer-readable media of claim 11, wherein the interface enables rules to be defined per job.

13. The non-transitory computer-readable media of claim 10, wherein the orchestration platform includes an exposed application programming interface for integration with additional job execution monitoring tools.

14. The non-transitory computer-readable media of claim 10, wherein the orchestration platform is integrated with a ticketing system for creating tickets for failed job executions.

15. A non-transitory computer-readable media storing computer instructions which when executed by one or more processors of a device cause the device to:
   access job scheduling information for a plurality of different environments each having a corresponding master that schedules job executions across a plurality of respective agents;
   provide unified job scheduling management across the plurality of different environments, using the job scheduling information;
   wherein the job scheduling information includes, for each environment of the plurality of different environments, a map of jobs scheduled by the corresponding master for execution by the plurality of respective agents, and wherein the map indicates each scheduled job and dependencies between scheduled jobs.

16. A non-transitory computer-readable media storing computer instructions which when executed by one or more processors of a device cause the device to:
   access job scheduling information for a plurality of different environments each having a corresponding master that schedules job executions across a plurality of respective agents;
   provide unified job scheduling management across the plurality of different environments, using the job scheduling information;
   wherein the job scheduling information includes, for each environment of the plurality of different environments, an execution status of jobs scheduled by the corresponding master for execution by the plurality of respective agents.

17. A method, comprising:
   at a computer system:
   accessing job scheduling information for a plurality of different environments each having a corresponding master that schedules job executions across a plurality of respective agents; and
   providing unified job scheduling management across the plurality of different environments, using the job scheduling information, wherein the unified job scheduling management includes at least one of:
   displaying the job scheduling information for the plurality of different environments in a consolidated view,
   performing an action triggered by a business rule defined for the job scheduling information,
   issuing an alert based on the job scheduling information, or
   automatic healing with predefined fixes in case of job execution failure.

18. A system, comprising:
   a non-transitory memory storing instructions; and
   one or more processors in communication with the non-transitory memory that execute the instructions to:
   access job scheduling information for a plurality of different environments each having a corresponding master that schedules job executions across a plurality of respective agents; and
   provide unified job scheduling management across the plurality of different environments, using the job scheduling information, wherein the unified job scheduling management is provided by an orchestration platform.

* * * * *